United States Patent [19]

Sasaki et al.

[11] 4,444,826
[45] Apr. 24, 1984

[54] EXTRUSION LAMINATED PRODUCT

[75] Inventors: Tohru Sasaki; Hiroyuki Endoh; Takeshi Nakadai, all of Fukushima, Japan

[73] Assignee: Keueha Kagaku Kogyo K.K., Tokyo, Japan

[21] Appl. No.: 353,652

[22] Filed: Mar. 1, 1982

[30] Foreign Application Priority Data

Feb. 28, 1981 [JP] Japan .................................. 56-27632

[51] Int. Cl.³ .......................................... B32B 27/00
[52] U.S. Cl. .................................. 428/216; 428/421;
428/422; 428/520; 428/522
[58] Field of Search ............... 428/421, 520, 522, 422, 428/216

[56] References Cited

U.S. PATENT DOCUMENTS

| 3,908,070 | 9/1975 | Marzolf | 428/421 |
|---|---|---|---|
| 4,221,757 | 9/1980 | Strassel | 428/421 |
| 4,272,585 | 6/1981 | Strassel | 428/421 |
| 4,317,860 | 3/1982 | Strassel | 428/421 |
| 4,317,861 | 3/1982 | Kidoh | 428/421 |
| 4,378,392 | 3/1983 | Segel | 428/421 |

FOREIGN PATENT DOCUMENTS 56-86748 7/1981 Japan .................................. 428/421

Primary Examiner—Ellis P. Robinson
Attorney, Agent, or Firm—Sughrue, Mion, Zinn, Macpeak and Seas

[57] ABSTRACT

An extrusion laminated product is described comprising at least three layers, wherein at least one of the surface layers comprises polyvinylidene fluoride, and an adhesive layer which is provided between the surface layer and other thermoplastic resin layers comprises a polymer comprising at least one of methyl methacrylate and ethyl methacrylate as a major component or a composition containing said polymer as a main component and from 0.3 to 30 phr of an ultraviolet absorber.

9 Claims, 1 Drawing Figure

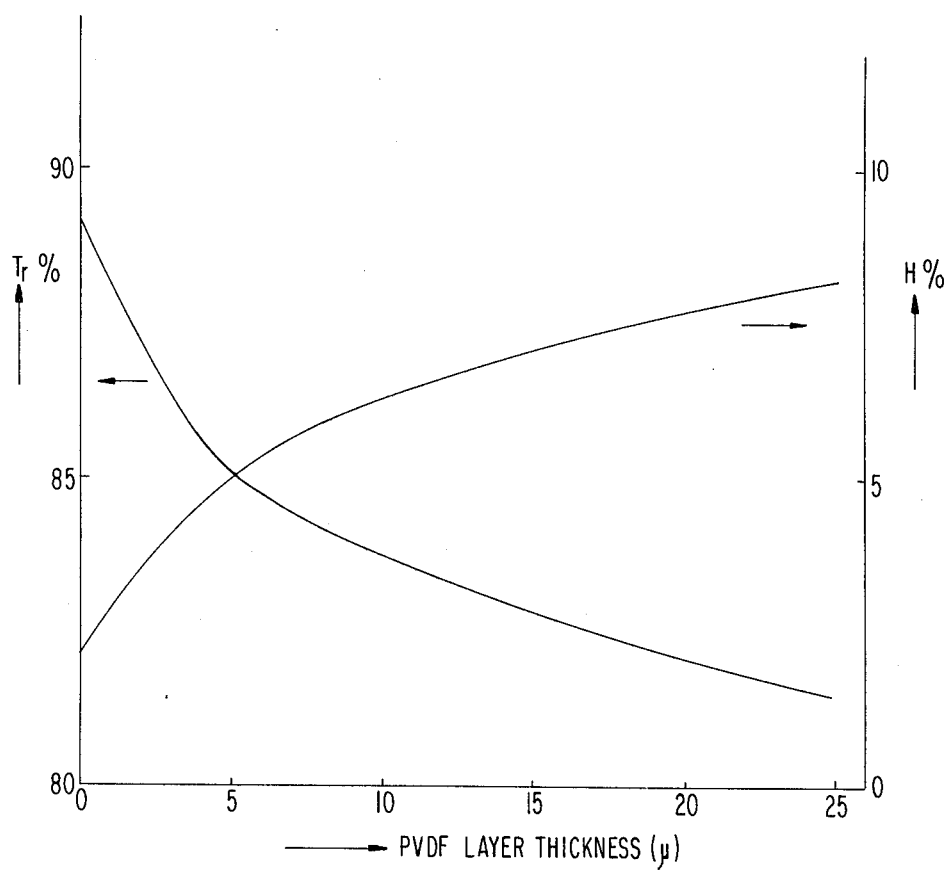

EXTRUSION LAMINATED PRODUCT

FIELD OF THE INVENTION

The present invention relates to a multilayer extrusion laminated product having at least one surface layer of polyvinylidene fluoride.

BACKGROUND OF THE INVENTION

Polyvinylidene fluoride (hereinafter referred to as "PVDF" for brevity) is a resin having excellent weathering resistance and chemical resistance. However, PVDF has disadvantages, such as that (1) the production cost is very high since it is a fluorine-type resin; and (2) immediately after extrusion from an extruder crystallization readily occurs due to its high crystallizability, resulting in formation of spherulites, and therefore PVDF sheets not orientated by stretching have poor transparence.

In order to utilize the excellent properties of PVDF, it has been proposed to laminate a film of PVDF on other transparent commercially available resins. There are various methods to produce such laminated products. Of such methods, the simplest method is a method comprising coextruding the resins to provide a laminated product, and this method permits one-step production of laminated products.

Such coextrusion to produce laminated films, for example, including a PVDF film is known as described, for example, in U.S. Pat. No. 3,647,612, and PVDF can be laminated on, for example, polymethyl methacrylate (PMMA) or polyvinyl chloride (PVC) by coextrusion. It is described, for example, in U.S. Pat. No. 3,253,060, that PVDF and PMMA have particularly high compatibility with each other and can be uniformly mixed. In addition, it is described in British Pat. No. 1,049,088 that other acrylic ester-type resins having structures similar to that of PMMA are compatible with PVDF. Therefore, the interface between the PVDF and acrylic ester-type resins is well bonded, and in laminating a PVDF layer on other resin layers, it is preferred to interpose therebetween an acrylic acid-type resin as an intermediate layer.

An attempt has been made to produce sheets having good transparency by coextrusion and lamination of PVDF and other transparent thermoplastic resins using an acrylic ester-type resin layer comprising ethyl methacrylate or methyl methacrylate as a main structural monomer as an intermediate layer. In this case, it is important to minimize formation of spherulites formed in the PVDF layer so as not to deteriorate the transparency. It is known that formation of spherulites is typically observed when molten resins are solidified at the temperature near the crystallization temperature thereof. In order to prevent such solidification at a temperature near the crystallization temperature, therefore, it is preferred that resins extruded from an extruder are rapidly cooled to temperatures much lower than the crystallization temperature. Thus, laminated products obtained by coextrusion are rapidly cooled from the surface side of PVDF where spherulites are most readily formed.

However, when fluid-like resins extruded from an extruder are taken off, for example, through the surface of a cooling roll, vibration of fluid-like resins inevitably occurs, at least to some extent. Therefore, if the cooling roll is maintained at low temperatures such that solidification occurs just when the resin comes into contact with the cooling roll, the taken off sheet lacks flatness. Thus, the solidification time is preferably set so that the resin is cooled after it comes into close contact with the cooling roll. For this purpose, in the case of PVDF, the cooling roll is usually maintained at temperatures ranging from 60° C. to 125° C. However, since the cooling temperature at taking off of the PVDF layer is limited, the formation of spherulites in the PVDF layer to a certain extent inevitably occurs. Furthermore, as the thickness of the PVDF layer increases, the cooling rate of PVDF in the interior of the layer lowers, resulting in the formation of large sized spherulites. Transparency is markedly reduced by the combination of an increase of thickness and the formation of large sized spherulites. Therefore, in producing transparent laminated products having a PVDF layer as a surface layer, it is preferred to reduce the thickness of the PVDF layer as thin as is practically possible.

It is also known that in laminating a sheet having good weathering properties made of PVDF, polyvinyl fluoride (PVF) or the like, on a sheet having poor weathering properties, ultraviolet absorbers (hereinafter referred to as "UVA" for brevity) can be incorporated into the sheet of PVDF, PVF or the like to protect the underlying sheet having poor weathering properties from deterioration by ultraviolet rays. In the case of laminated sheets having a PVDF surface layer, it is considered to prevent the deterioration of underlying substrate sheets due to ultraviolet rays by incorporating UVA into the PVDF surface layer. However, the amount of UVA which can be uniformly mixed with PVDF is limited. For example, if the UVA is added in a large amount, phase separation occurs, deteriorating the transparency, and the UVA which bleeds to the surface of the PVDF surface layer may flow away by rainwater or evaporate. In the case of using the UVA in an amount so as not to cause phase separation, it has been confirmed that if the thickness of the PVDF surface layer is greatly reduced to obtained a transparent laminated product as described above, the amount of the UVA contained in the PVDF layer is very small and as a result it becomes difficult to prevent the underlying resin layer from the deterioration by ultraviolet rays.

SUMMARY OF THE INVENTION

Only a limited number of polymers, such as polymethyl methacrylate and polyethyl methacrylate are now known to have compatibility with polyvinylidene fluoride, and it has been believed that the adhesion properties of the adhesive layer is deteriorated by the addition of a large amount of the UVA thereinto.

Surprisingly, the addition of the UVA to the adhesive layer does not deteriorate the adhesion properties thereof and does not cause the formation of bubbles during molding.

Further, it has been believed that ultraviolet rays would reach the interface between the PVDF layer and the adhesive layer, causing light deterioration around the interface of the adhesive layer, but it was confirmed that the extrusion laminated product has practically sufficient weathering resistance.

Accordingly, one object of the invention is to provide a laminated product having a polyvinylidene fluoride film as at least one surface layer, which can maintain its good surface state even after being exposed to atmospheric conditions for a long period of time and at the same time, is free from deterioration by ultraviolet rays.

Another object of the invention is to provide an extrusion laminated product comprising at least three layers, wherein at least one surface layer comprises a polyvinylidene fluoride resin, preferably containing an ultraviolet absorber (UVA) in an amount up to 3 phr (parts by weight per hundred parts by weight of resin and hereinafter the same), and an adhesive layer between the polyvinylidene fluoride outer layer and another thermoplastic resin layer comprises a polymer prepared from at least one of ethyl methacrylate and methyl methacrylate as a major ingredient or a composition containing the polymer as a major component (e.g., at least about 50 wt%) and from 0.3 to 30 phr of an ultraviolet absorber.

BRIEF DESCRIPTION OF THE DRAWING

The FIGURE is a graph showing the relation between the thickness of a PVDF layer and the degree of transparency or haze.

DETAILED DESCRIPTION OF THE INVENTION

At least one surface layer of the laminated product according to the invention comprises a polyvinylidene fluoride resin. The polyvinylidene fluoride which can be used in the invention includes a vinylidene fluoride homopolymer, a copolymer comprising at least 70 mol% of vinylidene fluoride and one or more comonomers copolymerizable therewith, such as tetrafluoroethylene, hexafluoropropylene, trifluoroethylene, ethylene trifluorochloroethylene or vinyl fluoride, and a composition comprising at least one of the above-described homopolymer and copolymer and one or more polymer having compatibility therewith. The polyvinylidene fluoride layer may contain an ultraviolet absorber (UVA), a nucleus-forming agent, a plasticizer, and so forth, if desired. In particular, the addition of the UVA in an amount of from 0.1 to 3 phr in the PVDF layer is preferred from the standpoint of improving the weathering resistance, since the formation of stripe-like bubbles does not occur as long as the amount of the UVA is small.

The upper limit for the thickness of the PVDF layer is not particularly limited. However, it can be seen from the FIGURE that when the thickness of the PVDF layer is in the range of 5μ or less, if the thickness slightly decreases, the haze (H, %) greatly decreases and also the degree of transparency is greatly improved. Therefore, considered only from the standpoint of transparency, the thickness is preferably 5μ or less. The most preferred thickness is 3μ or less. The lower limit for the thickness of the PVDF layer is also not particularly limited. However, when the thickness of the PVDF layer is less than 0.5μ, it is too thin and the surface layer is easily worn out by slight friction. Furthermore, due to the thin surface layer the amount of the UVA which can be incorporated into the PVDF layer becomes very small, resulting in deterioration of the absorption effect of ultraviolet rays. In general, therefore, the thickness of the PVDF layer is preferably at least 0.5μ.

An adhesive layer which can be used in the invention to bond the polyvinylidene fluoride outer layer and another thermoplastic resin layer is composed of a polymer comprising at least one of ethyl methacrylate and methyl methacrylate as a main structural monomer or a composition containing such a polymer as a major component (e.g., at least about 50 wt%). Examples of the polymer for the adhesive layer are a methyl methacrylate homopolymer (hereinafter referred to as "PMMA" for brevity), an ethyl methacrylate homopolymer, a copolymer comprising at least 50 mol% of at least one of methyl methacrylate and ethyl methacrylate and a comonomer, e.g., alkyl methacrylate (other than methyl methacrylate and ethyl methacrylate); an alkyl acrylate such as methyl acrylate, ethyl acrylate or butyl acrylate; and so forth, and a composition containing a least one of the above-described homo- and copolymers. Preferred examples thereof are homo- and copolymers consisting of the above-described monomers alone. More preferred examples are PMMA, a copolymer of methyl methacrylate and methyl acrylate, and a copolymer of methyl methacrylate and butyl acrylate. The term "copolymer" as used herein is not limited to a random copolymer, but includes, for example, a graft copolymer. For example, a copolymer obtained by graft-polymerizing a monomer mixture composed mainly of methyl methacrylate onto acrylic saturated cross-linked rubber is preferably used.

The UVA which is incorporated into the adhesive layer may be any conventional UVAs. Of those, benzotriazole type and benzophenone type UVAs are preferred.

The lower limit for the amount of the UVA added varies depending on the degree of weathering resistance required and the thickness of the adhesive layer. For example, when the thickness of the adhesive layer is small and the amount of the UVA is small, ultraviolet rays reach underlying layers, causing the deterioration thereof. On the other hand, the upper limit for the amount of the UVA added varies depending on the compatibility of the UVA with the polymer which constitutes the adhesive layer. For example, when the compatibility is poor, if the amount of the UVA is increased, the adhesive layer peels off from the polyvinylidene fluoride layer. Thus the amount of the UVA added in the invention is from 0.3 to 30 phr, preferably from 1 to 15 phr, and more preferably from 2 to 5 phr, based on the amount of polymer which constitutes the adhesive layer.

The thermoplastic resin layer which is bonded to the polyvinylidene fluoride layer via the adhesive layer may be made of any conventional thermoplastic resin. Of these conventional thermoplastic resins, resins having an impact resistance such as a polyvinyl chloride resin (hereinafter referred to as "PVC" for brevity), a polycarbonate resin (hereinafter referred to as "PC" for brevity), and an acrylonitrile-butadiene-styrene resin (hereinafter referred to as "ABS" for brevity) are preferably used.

The PVC which can be used include a vinyl chloride homopolymer, a copolymer comprising at least 70 mol% of vinyl chloride and one or more monomer copolymerizable therewith, and a composition composed mainly of at least one of the homo- and copolymers. The PVC may contain additives such as an impact resistance-increasing agent, a processing additive, and a filler.

The PC which can be used is not limited to conventional polycarbonates, but includes various polycarbonates such as copolycarbonates, hetero-bond copolymers containing a carbonate bond and another bond in the main chain, and compositions composed mainly of the polycarbonates.

The ABS which can be used includes a copolymer consisting essentially of acrylonitrile, styrene and butadiene, copolymers additionally containing other monomer(s) such as methyl methacrylate, and compositions composed mainly of such copolymer.

A particularly preferred method of preparing the laminated product of the invention is an extrusion molding method which comprises laminating the layers in a multilayer molding die by a coextrusion procedure and extrusion molding the laminate. In addition, other conventional extrusion lamination methods, for example, a method which comprises melt extruding each resin and laminating and bonding the resulting layers outside a molding die by means of rolls or presses, can be used.

The shape of the laminated product of the invention is not limited to a planar form, and the laminated product may be a tubular form, a corrugated form and so forth. The laminated product of the invention may be used alone or by laminating it on other substrates.

The present invention will be now explained in greater detail by reference to the following Examples and Comparative Examples, but is not limited thereto. Unless otherwise indicated, all percentages, parts, ratios and the like are by weight.

EXAMPLES 1 TO 6 AND COMPARATIVE EXAMPLE 1

(1) Preparation of Material for Surface Layer

To 100 parts of a vinylidene fluoride homopolymer having an inherent viscosity of 1.00 dl/g (measured in a dimethylformamide solution having a concentration of 0.4 g/dl at 30° C.) were added 20 parts of an acryl resin (trade name "Acrypet HR-70", produced by Mitsubishi Rayon Co., Ltd.) and 1.0 part by weight of 2-(2'-hydroxy-3',5'-di-tert-butylphenyl)-5-chlorobenzotriazole as an ultraviolet absorber. The resulting mixture was mixed with a blade blender for 30 minutes and extruded at 200° C. to form pellets.

(2) Preparation of Material for Adhesive Layer

To 100 parts of the same acryl resin as used in (1) above was added the same ultraviolet absorber as used in (1) above in an amount of 0.2, 0.5, 3, 5, 10, 20 and 25 parts as shown in Table 1. Each of the resulting mixture was extruded at 190° C. to form pellets.

(3) Preparation of Material for Underlying Layer

| | Amount (parts) |
|---|---|
| Polyvinyl chloride ($\overline{P}$ = 700)* | 87 |
| Impact resistance-increasing agent** | 13 |
| Tin octylate | 2.5 |
| Glycerin monostearate | 0.5 |
| Wax | 0.2 |

*$\overline{P}$: Average degree of polymerization
**Prepared by graft polymerizing a monomer mixture consisting of 16.9 parts of styrene, 10.6 parts of methyl methacrylate and 0.09 part of divinylbenzene onto a cross-linked rubber copolymer prepared from 50 parts of butadiene, 15 parts of styrene and 0.65 part of divinylbenzene, and then further graft polymerizing a monomer mixture consisting of 7.5 parts of methyl methacrylate and 0.04 part of divinylbenzene onto the graft copolymer obtained in the first graft polymerization.

The above mixture was kneaded in a Henschel mixer at 120° C. for 10 minutes to prepare the material for the underlying layer.

Pellets obtained in (1) were extruded using a 32 φ (mm in diameter and hereinafter the same) extruder at 235° C., pellets obtained in (2) were extruded using a 25 φ extruder at 235° C., and the material obtained in (3) was extruded using a 90 φ extruder at 195° C. The resulting three layers were subjected to composite fluidization in a composite T die (1.3 m wide) for three layer coextrusion and extruded therefrom. The sheet thus-prepared was drawn with a roll maintained at 70° C., cooled, and then was subjected to heat treatment under relaxation with a roll maintained at 90° C. to obtain a sheet consisting of a 2μ thick surface layer, a 4μ thick adhesive layer, and a 44μ thick underlying layer.

Each sheet was measured in respect to total light transmittance (Tr), Yellow Index (YI), peeling-off of layers, and so forth both immediately after molding and also after allowed to stand in a sunshine weatherometer for 2,500 hours. The results are shown in Table 1. The total light transmittance (Tr) was determined by the ratio of $I/I_0$ wherein $I_0$ was the intensity of 500 to 600 mμ incident light and I was the intensity of average transmitted light, which were measured using a spectrophotometer (a product of Hitachi Corp.). The Yellow Index (YI) was measured according to JIS 7103 (JIS refers to Japanese Industrial Standard). For all the sheets, the formation of stripe-like bubbles and the peeling-off of layers were not observed.

TABLE 1

| | Amount of Ultraviolet Absorber in Adhesive Layer (phr) | Immediately after Molding | | After 2,500 Hours in Weatherometer | |
|---|---|---|---|---|---|
| | | Tr (%) | YI | Tr (%) | YI |
| Comparative Example 1 | 0.2 | 85 | 3.4 | 77 | 20 |
| Example 1 | 0.5 | 84 | 3.5 | 80 | 11 |
| Example 2 | 3 | 85 | 3.5 | 82 | 7 |
| Example 3 | 5 | 84 | 3.5 | 82 | 5 |
| Example 4 | 10 | 83 | 3.5 | 82 | 4 |
| Example 5 | 20 | 83 | 3.5 | 82 | 4 |
| Example 6 | 25 | 83 | 3.6 | 82 | 4 |

EXAMPLES 7 TO 11 AND COMPARATIVE EXAMPLES 2 TO 3

(1) Preparation of Material for Surface Layer

To 100 parts of the same vinylidene fluoride homopolymer as was used in Example 1 were added 20 parts of PMMA and an ultraviolet absorber in amounts of 0, 0.5, 1, 2, 3, 5, and 7 parts, as shown in Table 2, and the resulting mixture was processed in the same manner as in Example 1 to form pellets. As the ultraviolet absorber, 2-hydroxyoctoxybenzophenone was used.

(2) Preparation of Material for Adhesive Layer

The same pellets as prepared in Example 4 except that the same ultraviolet absorber as used in (1) above was used.

(3) Preparation of Material for Underlying Layer

The same PVC material as prepared in Example 1 was used.

The above prepared materials were subjected to composite extrusion under the same conditions as in Example 1 to obtain a composite sheet having the same thickness and construction as in the sheet obtained in Example 1. The physical properties of the sheet were measured in the same manner as in Example 1. The results obtained are shown in Table 2.

TABLE 2

| | Amount of Ultraviolet Absorber in Surface Layer | Formation of Voids in Stripe-Like Bubbles | Immediately after Molding Tr (%) | YI | After 2,500 Hours in Weatherometer Tr (%) | YI | Peeling-Off of Layers |
|---|---|---|---|---|---|---|---|
| Example 7 | 0 | None | 83 | 3.4 | 82 | 4.0 | Partially observed |
| Example 8 | 0.5 | None | 83 | 3.4 | 82 | 3.9 | Not observed |
| Example 9 | 1 | None | 83 | 3.5 | 83 | 3.9 | Not observed |
| Example 10 | 2 | None | 83 | 3.5 | 83 | 3.8 | Not observed |
| Example 11 | 3 | None | 83 | 3.5 | 83 | 3.8 | Not observed |
| Comparative Example 2 | 5 | Partially formed | 82 | 3.6 | 82 | 3.7 | Not observed |
| Comparative Example 3 | 7 | Formed | 82 | 3.6 | 82 | 3.7 | Not observed |

EXAMPLE 12

The same procedure of Example 10 was repeated except that polycarbonate ("Panlight F-125", a product of Teijin Kasei Co., Ltd.) was used as a material for the underlying layer and was extruded at 290° C. from a 90 $\phi$ extruder.

Immediately after the molding, the Tr was 87% and YI was 5.8, and after being allowed to stand in a sunshine weatherometer for 2,500 hours, the Tr was 86% and YI was 6.8.

REFERENCE EXAMPLE

Laminated products were prepared by coextruding PVC ($\overline{P}$=700) as a substrate, PMMA ("ACRYPET HR-70", a product of Mitsubishi Rayon Co., Ltd.) as an intermediate layer, and PVDF ($\eta_{inh}$=0.90 dl/g) for a surface layer, wherein the thickness of the intermediate layer was 20μ, the total thickness of the laminated product was 1,000μ, and the thickness of the PVDF surface layer was varied, viz., 0μ, 5μ, 10μ, and 20μ. These laminated products were cooled with cooling rolls maintained at 80° C. to produce laminated sheets. Parallel light transmittance and haze of each sheet were measured. The results obtained are shown in FIG. 1. It was clarified from FIG. 1 that the light transmittance and haze are remarkably improved when the thickness of the PVDF surface layer was 5μ or less.

EXAMPLE 13

(1) Preparation of Material for Surface layer

To 100 parts of a vinylidene fluoride homopolymer having an inherent viscosity of 1.00 dl/g (measured in a dimethylformamide solution having a concentration of 0.4 g/dl at 30° C.) were added 40 parts of an acryl resin (the same PMMA as used in Reference Example) and 0.3 part of 2-(2'-hydroxy-3',5'-di-tertbutylphenyl)-5-chlorobenzotriazole as an ultraviolet absorber. The resulting mixture was mixed with a Henschel blender for 15 minutes and extruded at 205° C. to form pellets.

(2) Preparation of Material for Adhesive Layer

A mixture of 100 parts of the same acryl resin as used in (1) above and 12.5 parts of the same ultraviolet light absorber as used in (1) above was extruded at 195° C. to form pellets.

(3) Preparation of Material for Substrate Layer

| | Amount (parts) |
|---|---|
| Polyvinyl chloride ($\overline{P}$ = 1,000) | 100 |
| Plasticizer (dioctyl phthalate) | 30 |
| Plasticizer (tricresyl phosphate) | 10 |
| Octyl tin maleate | 2 |
| Wax | 0.15 |
| UVA (the same as in Example 1) | 0.5 |

The above mixture was blended with a Henschel mixer at 120° C. for 10 minutes to prepare the material for the adhesive layer.

Pellets obtained in (1) were extruded from a 32 $\phi$ extruder at 235° C., pellets obtained in (2) were extruded from a 25 $\phi$ extruder at 235° C., and the material obtained in (3) was extruded from a 90 $\phi$ extruder at 195° C. The resulting three layers were subjected to composite fluidization in a three layer composite T die, cooled by means of rolls maintained at 80° C., drawn, and then was subjected to relax heat treatment by means of rolls maintained at 95° C. to obtain a sheet consisting of a 2μ thick surface layer, a 4μ thick intermediate layer, and a 44μ thick substrate (total thickness, 50μ).

Total light transmittance (Tr, %) of the sheet was 93% immediately after molding and 91% after being allowed to stand in a sunshine weatherometer (a product of Suga Testing Machine Co., Ltd.) for 2,500 hours. Further, peeling-off of layers in the form of blisters between the layers was not observed.

EXAMPLES 14 TO 18

(1) Preparation of Material for Surface Layer

In the same manner as in Example 13, 1 part of an ultraviolet absorber was added to 100 parts of a vinylidene fluoride homopolymer, and the resulting mixture was then processed to form pellets. In this case, 2-hydroxy-4-octoxybenzophenone was used as the ultraviolet absorber, and PMMA was not used.

(2) Preparation of Material for Adhesive Layer

In the same manner as in Example 13 except that 10 parts of the same ultraviolet absorber as used in (1) above, pellets were prepared.

(3) Preparation of Material for Substrate Layer

The same PVC mixture as used in Example 13 was used.

Coextrusion was performed under the same conditions as in Example 13 to produce a 0.5μ/5μ/44.5μ sheet (Example 14), a 2μ/5μ/43μ sheet (Example 15), a 5μ/5μ/40μ sheet (Example 16), an 8μ/5μ/37μ sheet (Example 17), and a 13μ/5μ/32μ sheet (Example 18), with the constructions noted being that of surface layer thickness/adhesive layer thickness/substrate layer thickness.

Total light transmittance (Tr, %) of each sheet was measured in the same manner as in Example 13. The results obtained are shown in Table 3.

TABLE 3

| | Thickness of Surface Layer (μ) | Tr (%) Immediately after Molding | Tr (%) After 2,500 Hours in Weatherometer |
|---|---|---|---|
| Example 14 | 0.5 | 94 | 92 |
| Example 15 | 2 | 93 | 91 |
| Example 16 | 5 | 91 | 89 |
| Example 17 | 8 | 88 | 86 |

TABLE 3-continued

| | Thickness of Surface Layer (μ) | Tr (%) | |
|---|---|---|---|
| | | Immediately after Molding | After 2,500 Hours in Weatherometer |
| Example 18 | 13 | 86 | 85 |

While the invention has been described in detail and with reference to specific embodiments thereof, it will be apparent to one skilled in the art that various changes and modifications can be made therein without departing from the spirit and scope thereof.

What is claimed is:

1. An extrusion laminated product comprising at least three layers, wherein at least one of the surface layers comprises polyvinylidene fluoride and has a thickness of from 0.5 to 13μ, and an adhesive layer having a thickness of from 4 to 20μ which is provided between the surface layer and other thermoplastic resin layers and comprises a polymer comprising at least one of methyl methacrylate and ethyl methacrylate as a major component or a composition containing said polymer as a major component and from 0.3 to 30 phr of an ultraviolet absorber.

2. An extrusion laminated product as in claim 1, wherein the surface layer comprising polyvinylidene fluoride additionally contains an ultraviolet absorber in an amount up to 3 phr.

3. An extrusion laminated product as in claim 1 or 2, wherein the adhesive layer contains from 1 to 15 phr of an ultraviolet absorber.

4. An extrusion laminated product as in claim 1, wherein the thickness of the surface layer comprising polyvinylidene fluoride is from 0.5μ to 5μ.

5. An extrusion laminated product as in claim 1, wherein the thickness of the surface layer comprising polyvinylidene fluoride is from 0.5μ to 3μ.

6. An extrusion laminated product as in claim 2, wherein the thickness of the surface layer comprising polyvinylidene fluoride is from 0.5μ to 5μ.

7. An extrusion laminated product as in claim 2, wherein the thickness of the surface layer comprising polyvinylidene fluoride is from 0.5μ to 3μ.

8. An extrusion laminated product as in claim 3, wherein the thickness of the surface layer comprising polyvinylidene fluoride is from 0.5μ to 5μ.

9. An extrusion laminated product as in claim 3, wherein the thickness of the surface layer comprising polyvinylidene fluoride is from 0.5μ to 3μ.

* * * * *